United States Patent [19]

Fritchman

[11] Patent Number: 4,642,037

[45] Date of Patent: Feb. 10, 1987

[54] REED VALVE FOR REFRIGERATION COMPRESSOR

[75] Inventor: Jack F. Fritchman, Cullman, Ala.

[73] Assignee: White Consolidated Industries, Inc., Cleveland, Ohio

[21] Appl. No.: 698,762

[22] Filed: Feb. 11, 1985

Related U.S. Application Data

[63] Continuation-in-part of Ser. No. 587,380, Mar. 8, 1984, abandoned.

[51] Int. Cl.⁴ .................. F04B 39/10; F16K 15/16
[52] U.S. Cl. ............................ 417/571; 417/569; 137/521; 137/855; 137/856
[58] Field of Search .......... 417/559, 565, 566, 569, 417/570, 571; 137/521, 855, 856

[56] References Cited

U.S. PATENT DOCUMENTS

| | | | |
|---|---|---|---|
| 358,568 | 3/1887 | Potter, Jr. | 137/521 X |
| 2,019,747 | 11/1935 | Taylor | 417/571 X |
| 2,193,123 | 3/1940 | Des Roches | 137/855 X |
| 2,864,394 | 12/1958 | Hempel | 137/521 X |
| 2,899,981 | 8/1959 | Binks | 137/855 X |
| 2,908,109 | 10/1959 | Rotwein | 137/855 X |
| 3,057,373 | 10/1962 | Bragg | 137/521 |
| 3,192,913 | 7/1965 | Rice | 137/855 X |
| 3,358,908 | 12/1967 | Gawin | 417/571 X |
| 3,375,972 | 4/1968 | Raufeisen | 137/571 |
| 3,606,588 | 9/1971 | Romerhaus | 417/299 X |
| 3,809,506 | 5/1974 | Malcosky | 417/571 X |
| 3,998,571 | 12/1976 | Falke | 417/569 |
| 4,275,999 | 6/1981 | Hetzel et al. | 417/299 |
| 4,580,604 | 4/1986 | Kawaguchi et al. | 137/856 |

FOREIGN PATENT DOCUMENTS

| | | | |
|---|---|---|---|
| 556960 | 4/1923 | France | 417/565 |
| 205328 | 12/1983 | German Democratic Rep. | 417/559 |
| 333773 | 12/1958 | Italy | 417/571 |
| 60881 | 5/1981 | Japan | 417/571 |
| 34078 | 2/1984 | Japan | 137/855 |
| 371688 | 4/1932 | United Kingdom | 417/565 |
| 1404181 | 8/1975 | United Kingdom | 137/855 |

Primary Examiner—Carlton R. Croyle
Assistant Examiner—Paul F. Neils
Attorney, Agent, or Firm—Pearne, Gordon, McCoy & Granger

[57] ABSTRACT

A suction valve for a small refrigeration compressor is in the form of a thin sheet metal reed having a sealing portion adapted to make sealing contact with a valve seat around the suction port on a valve plate. The valve reed is formed from a valve sheet by an outline defining cut so that the valve reed is integral with the sheet. The valve reed has a reduced width neck portion and in this neck portion the material is plastically deformed along a bend line so that in a normal unstressed condition the sealing portion of the reed is spaced away from the valve seat by a slight distance and as soon as the piston starts on the compression stroke the fluid pressure forces the sealing portion into sealing engagement to prevent back-flow through the suction port. When the piston starts the suction stroke, the biasing of the valve reed causes the sealing portion to move out of engagement with the valve seat before there is a substantial pressure differential across the suction valve. The compressor also has a reed-type discharge valve in which the valve head is normally inclined to the valve seat while making contact with the seat only at one point at the side of the valve head.

19 Claims, 12 Drawing Figures

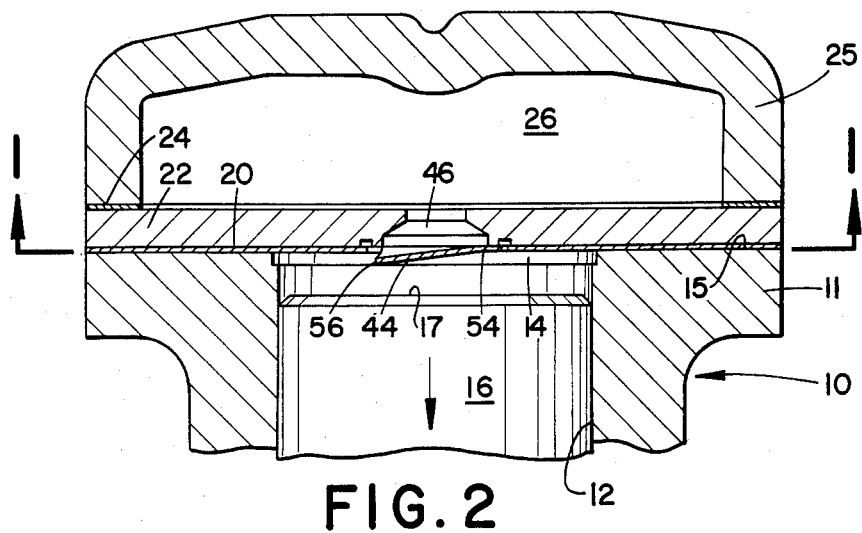
FIG. 2
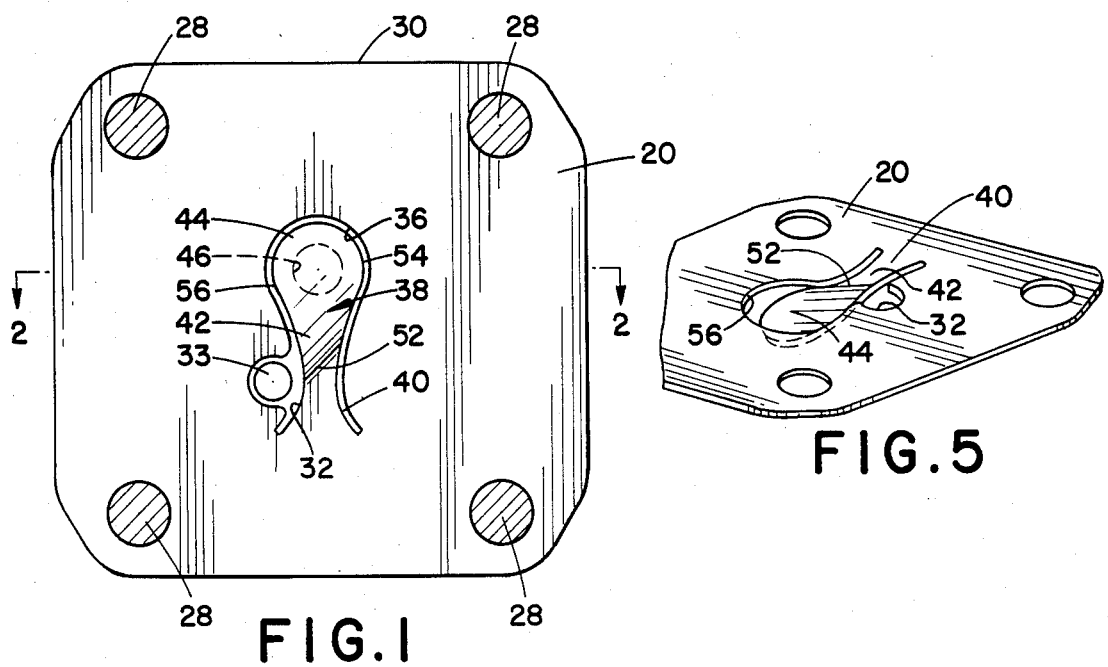
FIG. 1
FIG. 5
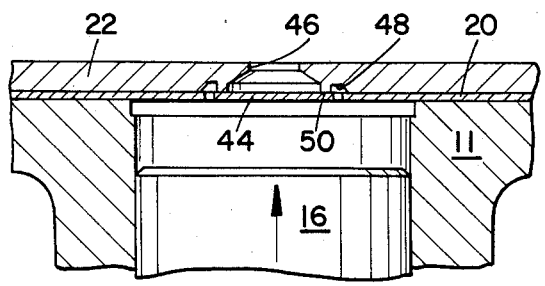
FIG. 3
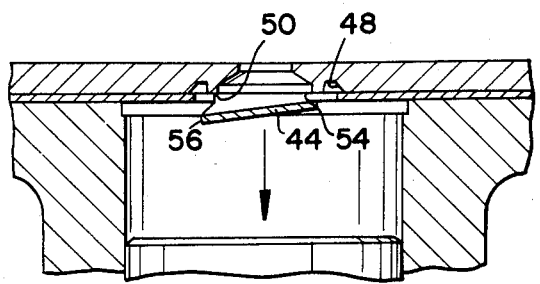
FIG. 4

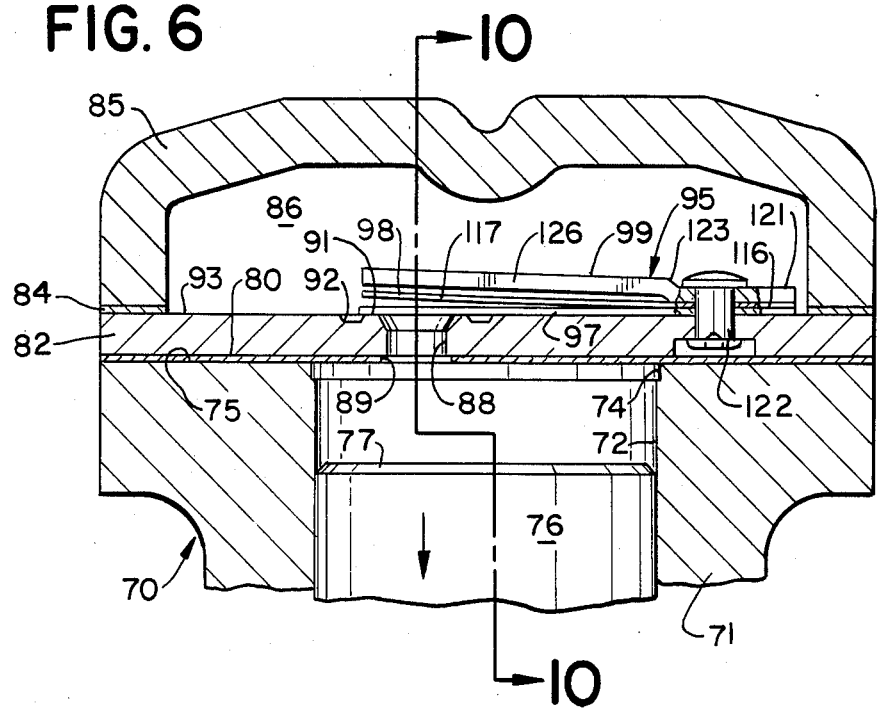
FIG. 6
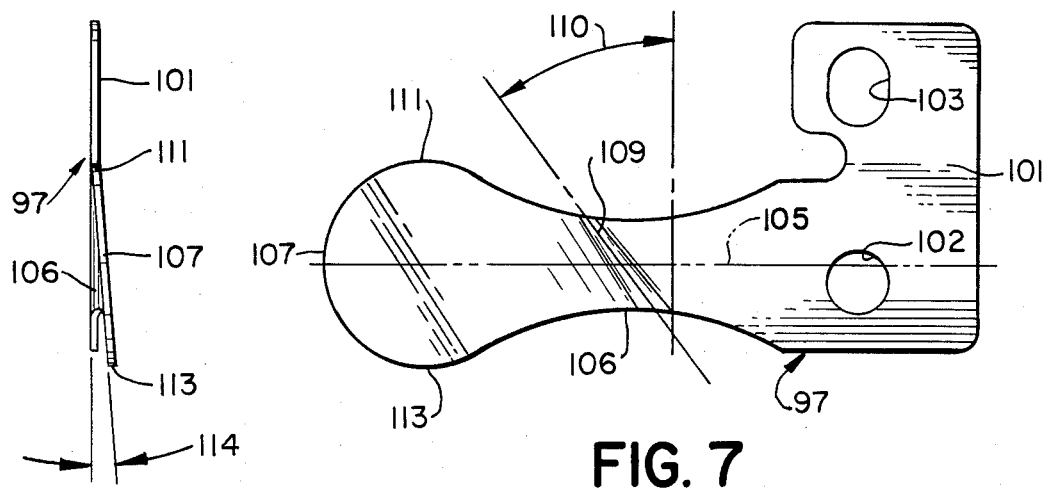
FIG. 8
FIG. 7
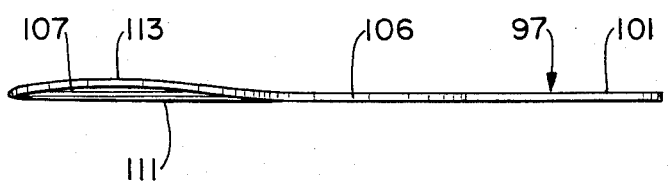
FIG. 9

REED VALVE FOR REFRIGERATION COMPRESSOR

BACKGROUND OF THE INVENTION

This application is a continuation-in-part of my copending application Ser. No. 587,380, filed Mar. 8, 1984, now abandoned.

The invention relates generally to hermetic refrigeration compressors and, more particularly, to suction or inlet valves and discharge valves for relatively small size refrigeration compressors of the type used in household appliances.

Hermetic refrigeration compressors of this type are relatively low horsepower units in the ¼ to ⅓ horsepower range, or even smaller, down to as low as 1/6 horsepower. One of the most common types of such compressors uses a single reciprocating piston driven by a motor rotating about a vertical axis, and since the motor is usually a high-speed, two-pole electric motor operating at a nominal 3600 rpm, or in practice more like 3400 rpm, the compression cycle of the piston within the cylinder occurs at a correspondingly high speed.

The cylinder in which the piston reciprocates is closed off by a cylinder head assembly which generally consists of a flat valve plate of sufficient thickness to give the necessary rigidity and above which is a cylinder head having inlet and outlet plenum chambers for connection to the suction and discharge mufflers mounted within the hermetic casing. The valve plate is a flat piece of metal smoothly finished on both sides, and has a discharge passage therethrough with a discharge valve on the outer side in the discharge plenum chamber. The suction or inlet valve is in the form of a thin reed valve of spring steel mounted on the piston side of the valve plate and generally has an enlarged end adapted to fit over an inlet passage, with the other end of the reed anchored a sufficient distance away that the valve reed can flex to allow the sealing portion to seat against a valve seat formed around the inlet passage and move away during the suction stroke to allow the refrigerant gases to enter the cylinder.

The valve seat around the inlet passage generally consists of an annular area in the plane of the surface of the valve plate immediately around the opening, and outward of this valve seat is a recessed area where the reed valve is unsupported to allow it to seat with higher sealing pressure in the annular shaped seat area. Generally, such valve reeds are formed out of a sheet of spring steel which extends over the entire surface of the valve plate, and the reed is formed by cuts of minimal width in this valve sheet so as to minimize the clearance volume remaining in the compression chamber when the piston is at the end of the compression stroke. The valve reed, as formed as an integral portion of a sheet of thin spring steel, is normally unstressed and, in its normal position, lies in the plane of the sheet and makes sealing contact against the valve seat area. When the piston is on the suction stroke, the initial movement of the piston does not cause the valve to open until the pressure drops to a point where the forces of the refrigerant in the inlet chamber in the cylinder head are sufficient to move the reed off its seat to allow the refrigerant gases to enter the cylinder.

It has been observed that when a compressor is in operation, there appears to be lag in the opening of the suction valve that is greater than that which would normally be required as a result of the inertia of the valve reed and the build-up of the opening suction pressure. It is believed that a principal cause of delayed opening is the adhesion between the valve and the valve seat caused by the oil present in the refrigerant gases for lubrication purposes. It has also been recognized that the delayed opening of the suction valve causes a certain decrease in the volumetric efficiency of the compressor, since earlier opening of the valve would allow an increased charge to enter the compression chamber and thereby increase the capacity of the compressor.

The discharge valve is also of the reed type but operates under somewhat different conditions. On the discharge stroke of the piston, the gas pressure rises rapidly to a much higher level than that during the suction stroke, so that the discharge valve opens more readily and usually requires some form of stop to limit its opening movement to avoid overstressing the reed. Nevertheless, there is still a short delay in opening because of the adhesive effect of the oil between the valve and the valve seat.

SUMMARY OF THE INVENTION

The present invention provides a compressor reed valve construction which operates to increase the compressor capacity by increasing the amount of refrigerant gases pumped as compared with a standard valve reed. This increases the overall efficiency of the compressor both as to overall capacity and as to the energy efficiency ratio which is determined by dividing the BTU/hr. output of the pump by the wattage input.

In accordance with the preferred embodiment of this invention, the reed portion of the suction or inlet valve formed in the valve sheet extending over the valve plate of the compressor is deformed by a bending of the reed valve so that the sealing portion no longer normally lies in the plane of the valve sheet in the unstressed condition. Preferably, this deformation is accomplished by bending the reed along a skewed line in a portion of the valve reed between the sealing portion and the anchor portion in such a way that the planar sealing portion becomes inclined at an angle to the planar valve seat and, in the unstressed condition, only engages the seat at one point along the side of the sealing portion so that the portion at the other side is normally spaced away from the valve seat.

It has been found that with the suction valve reed of this invention, the valve reed seats during the compression stroke of the compressor just as efficiently as the prior art where the sealing portion of the valve reed normally, in the unstressed condition, makes full sealing contact with the valve seat. However, on the suction portion of the valve stroke, the valve reed of the present invention opens at a lower crank angle because the deformation of the valve reed causes it to twist and pull loose of the adhering forces caused by the oil present between the valve reed and the valve seat before the pressure differential on the suction stroke actually causes the reed to flex away from the valve plate. By thus having an earlier opening of the suction valve as compared to a standard valve, the capacity of the compressor is notably increased and increased at a much greater amount than the power required to drive the compressor. Because the capacity increases more than the power requirement, the result is an overall increase in the energy efficiency ratio of the compressor.

The reed valve used as the discharge valve may be formed in a manner similar to the suction valve. The reed has a base secured to the valve plate spaced from the valve seat and a head overlying the valve seat. Between the base and head is a neck portion having a skewed bend line so that the valve head, when the valve is unstressed, contacts the valve seat only at one point along the side of the valve seat and the portion opposite is spaced away from the valve seat. Alternatively, the valve head may be flat and unbent but mounted in a plane inclined to the valve seat so that the valve head engages the valve seat in the same manner.

BRIEF DESCRIPTION OF THE DRAWINGS

FIG. 1 is a plan view of the suction valve according to the preferred embodiment of the invention, looking toward the cylinder head;

FIG. 2 is a fragmentary, taken on line 2—2 of FIG. 1 through the compressor, including the cylinder head and valve plate showing the suction valve;

FIG. 3 is a fragmentary view similar to FIG. 2, showing the position of the suction valve when the piston is on the compression or discharge stroke;

FIG. 4 is an enlarged, fragmentary view, similar to FIG. 3, but showing the piston during the suction or intake stroke;

FIG. 5 is a fragmentary, perspective view of the suction valve;

FIG. 6 is a fragmentary, cross-sectional view through the compressor, including the cylinder head and valve plate, showing a discharge valve according to the preferred embodiment of the invention;

FIG. 7 is a plan view of the discharge valve reed of FIG. 6;

FIG. 8 is an end elevational view of the discharge valve reed;

FIG. 9 is a side elevational view of the discharge valve reed;

DESCRIPTION OF THE PREFERRED EMBODIMENTS

Figure 10:
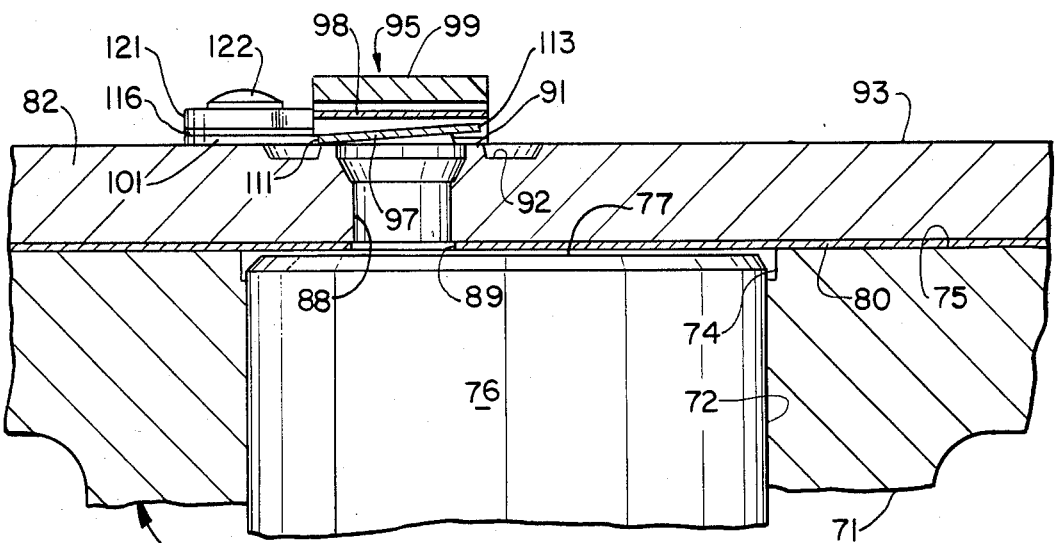
FIG. 10 is a fragmentary, cross-sectional view taken along line 10—10 of FIG. 6 showing the discharge valve reed in the unstressed condition.
Figure 11:
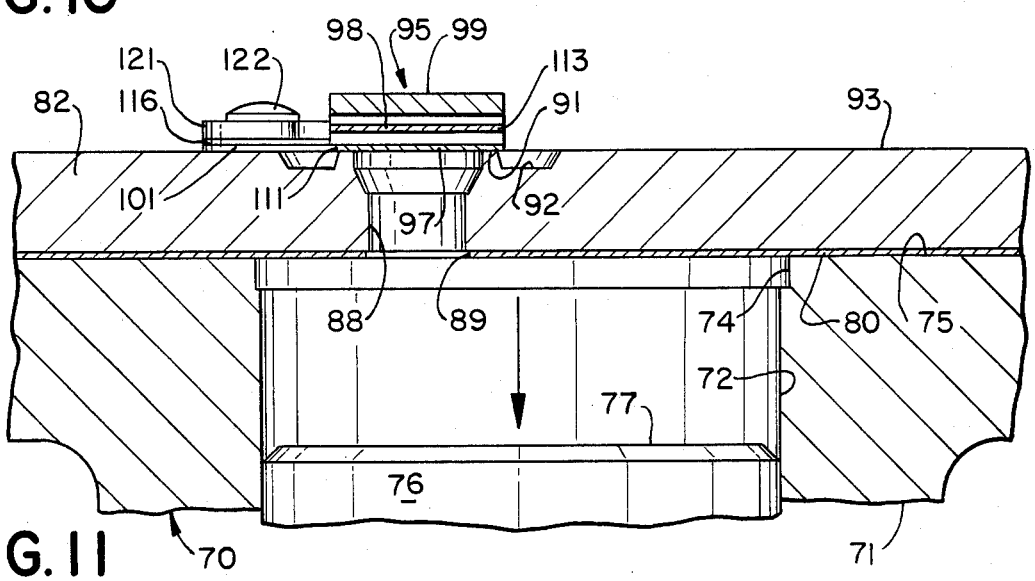
FIG. 11 is a fragmentary, cross-sectional view similar to FIG. 10 but showing the discharge valve reed in the closed position during the suction stroke.

Referring to the drawings in greater detail, FIG. 2 shows a fragmentary, cross-sectional view through a portion of a typical hermetic refrigeration compressor 10 in the area of the cylinder head. Since the other portions of the compressor form no part of the present invention, they have not been shown or described since they are conventional in construction and operation.

The compressor 10 includes a cylinder block 11 having a cylinder bore 12 extending axially therethrough to a planar end face 15 which lies in a plane perpendicular to the axis of the cylinder bore 12. A counterbore 14 is located in the end of the cylinder bore 12 adjacent the end face 15 for purposes of assembly and is made as small as possible to minimize the clearance volume. A piston 16 is fitted within the cylinder bore 12 and reciprocated by a suitable crank and connecting rod arrangement (not shown). The piston 16 has a flat end face 17 and is positioned at top center position to be as close as possible to the cylinder block end face 15. Overlying the end face 15 may be a suitable gasket or shim (not shown) above which is the valve sheet 20 which is formed from a sheet of spring steel, as will be described in greater detail hereinafter. Above the valve sheet 20 and in direct contact therewith is a planar valve plate 22 formed from a suitable material such as cast iron and of sufficient thickness to provide necessary rigidity.

On the outer face of the valve plate 22 around the outer periphery is located a suitable sealing gasket 24 positioned between the valve plate 22 and a cylinder head 25 overlying the valve plate 22 and defining therein an inlet plenum chamber 26 which is connected to the suction muffler of the compressor, and hence to the inlet gases from the remainder of the refrigeration system. It will be understood that the cylinder head 25 also provides an exhaust plenum chamber (not shown) in the customary manner, which is connected in turn to the discharge mufflers, and hence to the exterior of the compressor. It will also be understood that the cylinder head 25, valve plate 22, and valve sheet 20 are all held firmly in contact with the cylinder block 11 by suitable means such as bolts 28, which may be positioned as shown in FIG. 1.

The essential feature of the present invention lies in the construction of the valve sheet 20, as shown in greater detail in FIGS. 1 and 5. As previously stated, the valve sheet 20 is formed from a sheet of suitable spring steel of uniform thickness, which may be, in a typical example, about 0.008 inch. The valve sheet 20 has a peripheral edge 30 which is substantially coextensive with the valve plate 22 and, in the center portion, has a cutaway portion 32 around the discharge port 33, which is connected to a discharge valve, which may also be of the reed type, mounted in the discharge plenum chamber. The valve sheet 20 also has a cut-off slot 36 which, on its one side, forms a border of the cutaway portion 32 and which defines the suction valve reed 38. It will be understood that the slot 36 is preferably of substantially uniform width, and made as narrow as practical to minimize clearance volume of the cylinder. The reed 38 has a base portion 40 of larger width where it joins to the remainder of the valve sheet and a reduced width neck or shank 42 between the base portion 40 and the head 44 which is generally of a circular shape. The head 44 is positioned over the suction port 46, which is also preferably of circular shape. Around the suction portion 46 is an annular groove 48 which, where possible, generally follows the location of the slot 36 and which serves to define a valve seat 50 of uniform width around the suction port 46. The function of the groove 48 is to prevent the build-up of any oil or contaminant around the valve seat to ensure the best possible sealing engagement between the valve reed head 44 and the valve seat 50.

The general configuration of the valve sheet 20 and the suction valve reed 38 as described above has long been used as suction valves in refrigeration compressors under the condition that all of the valve sheet 20 be free of distortion so that in the unstressed condition the suction valve reed 38 lies in the plane of the valve sheet 20, and hence with the valve head 44 in sealing engagement with the valve seat 50. However, in accordance with the present invention, the suction valve reed 38 is given a bend or permanent set in such a way that the valve head 44 contacts the valve seat 50, under unstressed conditions, only at one portion around its periphery. According to the preferred embodiment of the present invention, the valve reed 38 is formed with a bend line 52 extending in a skewed direction across the neck 42 so that the head 44 is in effect normally at an angle with the one side 54 normally making engagement with the adjacent portion of the valve seat 50, while the other side 56 of the head 44 is normally spaced away from the adjacent portion of the valve seat 50. The bend formed at line 52 is such that the spring material of the valve sheet is given a permanent deformation or set and the head 44 is at an angle of approximately 3 degrees to 4 degrees as measured transversely of the axis of the valve reed. The other side 56 of the valve head 44 is thus normally spaced from the valve seat by a distance of one or two times the thickness of the material of the valve sheet itself.

This set as applied to the valve reed is not so great as to prevent the head from seating against the valve seat 50 when the piston is on the compression stroke, and it is not believed that at the beginning of the compression stroke this condition of the valve reed causes any noticeable delay in the seating action. Thus, as shown in FIG. 3, as the piston is on the compression stroke, the valve head 44 is deflected into the plane of the valve sheet 20, and therefore, makes sealing engagement with the valve seat 50 and no gases are forced outwardly through the suction port. However, after the piston passes top dead center and begins moving away from the valve plate as shown in FIG. 2, there are no longer any compression forces within the cylinder to hold the valve head 44 against the valve seat 50. There is, however, the adhesive effect caused by the presence of oil within the compressor, which tends to hold the prior art valve head in sealing engagement even after the suction stroke begins. However, as shown in FIG. 2, with the present valve reed, the bias built into the valve by the bend line 52 and the set of the valve reed is such as to cause it to overcome the adhesive forces of the oil and move partially away from the valve seat 50. Thus, as the piston continues downwardly on the suction stroke, as shown in FIG. 4, there are no longer any such adhesive forces holding the valve reed in contact with the valve plate, and it can quickly move to an open position to allow proper filling of the cylinder during the suction stroke. This, in effect, gives an early opening to the suction valve before any substantial pressure differential builds up across the valve, with the result that there is more complete filling of the cylinder and the pumping capacity of the compressor is therefore actually increased by the improved volumetric efficiency provided by the suction valve of the present invention.

This has been proven by actual tests of compressors under laboratory conditions, where the same compressor has first been run using a standard suction reed in which the reed portion is, in the unstressed condition, coplanar with the remainder of the valve sheet, and therefore, in the unstressed condition, in full sealing engagement with the valve seat. The compressor is then tested in that condition and thereafter disassembled, and the standard suction reed replaced by the skewed reed of the present invention, the compressor is reassembled and the same tests are run again. The following Table 1 shows the results of these tests:

TABLE 1

|  | BTU/hr. | Watts | EER |
|---|---|---|---|
| L208 (X8307) | | | |
| Std. Suction Reed | 805 | 199 | 4.05 |
| Skewed Reed | 861 | 204 | 4.22 |

TABLE 1-continued

|  | BTU/hr. | Watts | EER |
|---|---|---|---|
| Factor | 1.070 | 1.025 | 1.042 |
| S208 (X7796) | | | |
| Std. Suction Reed | 813 | 181 | 4.49 |
| Skewed Reed | 855 | 182 | 4.70 |
| Factor | 1.052 | 1.006 | 1.047 |
| L213 (X7761) | | | |
| Std. Suction Reed | 1289 | 308 | 4.19 |
| Skewed Reed | 1330 | 313 | 4.25 |
| Factor | 1.032 | 1.016 | 1.014 |
| L208 (Ave.10) | | | |
| Std. Suction Reed | 830 | 204 | 4.07 |
| Skewed Reed | 876 | 207 | 4.23 |
| Factor | 1.055 | 1.015 | 1.039 |
| ML064 (Ave.10) | | | |
| Std. Suction Reed | 706 | 184 | 3.84 |
| Skewed Reed | 747 | 189 | 3.94 |
| Factor | 1.058 | 1.027 | 1.026 |
| AVERAGE FACTOR | 1.053 | 1.018 | 1.034 |

The compressor marked as L208 is a basic small size refrigeration compressor, while the compressor marked S208 is a compressor of similar displacement but having various other features contributing to a higher energy efficiency ratio.

The third test on compressor L213 shows a compressor of larger displacement, while the fourth test is an average of 10 L208 compressors and the fifth test is another average of 10 compressors of a different construction.

It can be seen that in each of the cases, as noted in the column "Watts" the power consumption of the compressor did increase slightly because of the increase in volumetric efficiency. On the other hand, the output of the compressor identified in BTU/hr. in each case went up to a greater degree, reflecting the greater output of the compressor using the valve reed of the present invention. The third column marked "EER" indicates the energy efficiency ratio of the compressor, which is the output in BTU/hr. divided by the input power in watts. Each of the examples shows a substantial increase in the energy efficiency ratio of the compressor and a change in each of the examples is indicated as a factor below each pair of entries.

From the foregoing, it can be seen that in the efforts to increase the energy efficiency ratio of the compressor, the mere change in the construction of the valve reed from the prior art flat reed to the skewed reed of the present invention can result in an increase in efficiency as high as 4.7%, and, in any case, a certain increase in the energy efficiency ratio has always been achieved by substituting the valve of the present invention for the prior art device.

FIG. 6 shows another embodiment of the invention as applied to the discharge valve of a hermetic refrigeration compressor which may be similar to or even identical with the compressor shown in FIG. 2. The compressor 70 is shown in only schematic form, since the other parts are conventional in nature and form no part of the present invention. Thus, compressor 70 includes a cylinder block 71 having a cylinder bore 72 extending axially therethrough and including a counterbore 74 adjacent the planar end face 75 which lies in a plane perpendicular to the axis of the cylinder bore 72. A piston 76 is mounted in the cylinder bore 72 and arranged to reciprocate to and from the end face 75 and the piston has an end face 77 which approaches the end face 75 at the end of the compression stroke of the piston.

A valve sheet 80 extends over and in contact with the end face 75 and includes the suction valve, which may be constructed as described above. Above the valve sheet 80 is a valve plate 82, together with gasket 84 and cylinder head 85, enclosing a discharge plenum 86. All of the above parts may be identical with corresponding parts shown in FIG. 2, it being understood that the discharge plenum 86 and the inlet plenum 26 may be formed in different parts of the same cylinder head.

The valve plate 82 has a discharge passage 88 extending therethrough, and in alignment with the discharge passage 88 is an opening 89 formed in the valve sheet 80. At its upper end, the discharge passage 88 terminates in a valve seat 91 which is coplanar with the upper surface 93 of the valve plate 82, and this upper surface in turn is parallel to the bottom surface of the valve plate 82 and the valve sheet 80. In accordance with usual practice, an annular groove 92 is formed in the upper surface 93 around the valve seat 91 for purposes of improving the contact between the valve seat and the discharge valve reed.

The discharge valve assembly 95 is mounted on the valve plate upper surface 93 within the discharge plenum 86 and includes a valve reed 97 adapted to move to and from the valve seat 91 together with a valve stop member 99 and an optional back-up spring 98 interposed between the valve reed 97 and the valve stop 99. The back-up spring 98 is optional and may not be necessary in all applications. However, when used, it is normally positioned intermediate the valve reed and the stop in such a manner that it does not engage or bias the valve reed when the latter is in a closed position against the valve seat 91. The back-up spring 98 is engaged by the valve reed only as it moves to the full open position adjacent the valve stop 99, where it serves to cushion the impact of the valve reed against the valve stop as well as to provide an additional biasing force in the closing direction to move the valve reed 97 away from the valve stop 99 when the valve closes. Each of these three members, the valve reed 97, the back-up spring 98, and the valve stop 99, is essentially identical when seen in the plan view, and therefore has an outline similar to that of the valve reed 97 as shown in FIG. 7. The back-up spring 98 generally is of substantially the same thickness as the valve reed 97, about 0.008 inch, while valve stop 99 is of considerably thicker metal, such as 0.090 inch, so as to be substantially rigid and undeflected by movement of the valve reed 97.

As shown in FIG. 7, the valve reed 97 has an elongated base portion 101 having therein a round opening 102 and an elongated opening 103 for tolerance purposes. Extending along an axis at right angles to an axis through the holes 102 and 103 is a neck portion 106 and an enlarged head portion 107 which is dimensioned to be larger than the valve seat 91, but not as large as the outer diameter of the annular groove 92 so as to be able to make sealing contact with the valve seat 91 when in coplanar contact therewith.

However, the valve reed 97 has the head portion 107 deflected out of the plane of the rest of the valve reed by means of a plastic deformation of the reed along a bend line indicated at 109. This bend line is at a skewed angle across the neck portion 106 adjacent the narrowest portion thereof and, as shown in FIG. 7, is made at an angle indicated at 110 with respect to a perpendicular to the line through the axis 105 of the valve reed extending from the base 101 to the head 107. As in the case of the suction valve reed described above, the angle 110 has been selected to be 35 degrees, and this angle has been used in the valves employed in the test data set forth elsewhere herein. The amount of the twist is better shown in FIGS. 8 and 9, wherein the angle 114 as shown in FIG. 8 indicates the amount of the twist. This twist is done by leaving the one side of the valve head 107 in the plane of the valve sheet as indicated at 111, while the diametrically opposite side 113 is raised an amount so that the angle 114 is approximately 2 degrees. When the valve reed 97 is in place, with the base 101 in contact with the upper surface 93 of the valve plate 82, then the valve reed, when in the unstressed condition, will have the one side 111 in contact with the valve seat 91. The opposite side 113 of valve head 107 will then be raised above the valve seat 91 a distance, assuming the angle 114 equals 2 degrees, of approximately 0.020 inch.

The back-up spring 98 is formed from spring steel of the same thickness as the valve reed 97 and has the same outline of the valve reed as shown in FIG. 7. Thus, the back-up spring has a base portion 116 and a finger portion 117 extending above the valve reed 97, including the neck 106 and head 107. However, the finger portion 117 is bent upwardly so that it does not contact the valve head 107 when the latter is in sealing position against the valve seat 91, nor does it contact the raised side 113 when the valve reed is in the unstressed condition as shown in FIG. 10. On the other hand, the back-up spring 98 has the finger portion 117 spaced away from the valve stop 99 so that the back-up spring is engaged by the valve reed only after it has substantially completed its opening movement so that the back-up spring cushions the valve reed against contact against the valve stop 99 and also provides a slight biasing closing force when the valve begins to close. It is understood that the back-up spring 98 may not be required in all applications, and does not affect the operation of the valve reed itself when in contact with the valve seat.

The valve stop 99 is formed of substantially thicker material so as to be rigid and unmoving as the valve reed opens and closes. Again, the valve stop 99 in outline has the same shape as that of the valve reed 97, as shown in FIG. 7, including the base 121, which clamps both the base 116 of the back-up spring and the base 101 of the valve reed to the valve plate 82 by suitable fastening means such as rivets 122. The valve stop 99 also extends over the valve reed and back-up spring and has an offset portion as shown in 123 and a sloping finger portion 126 to provide sufficient clearance for the valve reed and back-up spring to allow the valve reed to completely open the desired distance and limit such opening movement to prevent excessive bending of the valve reed, which would cause excessive stress and early failure of the valve reed in operation.

When the compressor is in operation, on the discharge stroke, the valve head 107 is forced away from the valve seat 91 as described in greater detail hereinafter, and as the piston moves toward the valve plate, the gases that on the previous stroke were inducted into the cylinder through the suction valve are now forced outwardly through the passage 88 and past the valve head 107 into the plenum 86. As the piston reverses its travel at the end of the stroke and before the suction valve has an opportunity to open, the spring action of the valve reed, particularly the bending taking place in the neck portion 106, will cause the head 107 to move back toward the valve seat 91 until the side 111 is in contact. However, upon further movement of the piston away from the valve plate, the pressure within the cylinder will be quite low, while high pressure will exist in the plenum 86. The effect of this back pressure in plenum 86 then acts on the entire valve head 107 and forces the other side 113 downward into engagement with the valve seat 91 to make sealing engagement therewith. After that, the discharge valve remains fully closed as the piston moves in the downward stroke, filling the cylinder through the suction valve. After the piston reverses its stroke and starts backward toward the valve plate 82, the suction valve is closed and the pressure begins to build up within the cylinder 72. For the initial portion of the stroke of the piston 76, both the suction valve, now closed, and the discharge valve will remain closed so that no flow takes place through either valve. However, as the pressure within the cylinder 72 builds up to a pressure level slightly less than that in the plenum 86, the spring action laterally across the valve head 107 between the sides 111 and 113, as a result of distortion produced along the bend line 109, provides sufficient force to lift the side 113 away from the valve seat 91 while the other side 111 remains in contact therewith. This initial opening takes place when the pressures within the cylinder 72 and plenum 86 are substantially balanced so that as further movement of the piston 76 within the cylinder 72 increases the pressure within the cylinder above that in the plenum 86, the entire valve head 107 will move upward to allow the compressed gases to be forced outward from the cylinder into the plenum 86.

The discharge valve thus operates to increase the efficiency of the compressor in much the same way as in the case of the suction valve described hereinabove. The twist imparted to the valve because of the deformation of the reed valve head out of the plane of the valve seat allows the valve to open slightly earlier in the discharge stroke of the piston than if the discharge valve were normally in the unstressed condition in sealing contact with the valve seat. This twisting action, whereby the raised side 113 moves off the valve seat to break the adhesion caused by the lubricating oil, allows the discharge valve to open slightly earlier and thus slightly decrease the work done in compressing the refrigerant gas as it is discharged into the discharge plenum. However, because the discharge valve operates on a much greater pressure differential, since the gas pressures within the discharge plenum 86 are far greater than the pressures in the inlet plenum 26, the increase in efficiency is not as great as in the case of the suction valve.

Tests have been performed on compressors in much the same way as described above in connection with the suction valve. That is, a given compressor is tested using a standard flat discharge valve, and thereafter disassembled and the standard valve replaced with the skewed discharge valve described hereinabove and the tests run again. The following Table 2 shows the results of these tests:

TABLE 2

|  | BTU/hr. | Watts | EER |
|---|---|---|---|
| G212 (X4273) |  |  |  |
| Flat Discharge Valve | 1218 | 239 | 5.10 |
| Skewed Discharge Valve | 1245 | 243 | 5.13 |
| Factor | 1.022 | 1.017 | 1.006 |
| GS108 (X7796) |  |  |  |
| Flat Discharge Valve | 809 | 156 | 5.18 |
| Skewed Discharge Valve | 828 | 157 | 5.27 |
| Factor | 1.024 | 1.006 | 1.017 |
| L209 (X4755) |  |  |  |
| Flat Discharge Valve | 831 | 169 | 4.92 |
| Skewed Discharge Valve | 830 | 167 | 4.97 |
| Factor | .999 | .988 | 1.010 |
| GS108 (X9489) |  |  |  |
| Flat Discharge Valve | 876 | 169.5 | 5.17 |
| Skewed Discharge Valve | 880 | 168 | 5.24 |
| Factor | 1.005 | .991 | 1.014 |
| GS108 (X9488) |  |  |  |
| Flat Discharge Valve | 902 | 175 | 5.15 |
| Skewed Discharge Valve | 928 | 178.5 | 5.20 |
| Factor | 1.029 | 1.020 | 1.010 |
| Average Factor | 1.016 | 1.004 | 1.011 |

As can be seen from Table 2, in four out of five cases the BTU/hr. increased slightly, and in the one case decreased a very minor amount. In three of the cases, the watts of the input also increased, while in two cases there was a slight decrease. In each case, however, the resulting "EER", or energy efficiency ratio, shows a slight increase ranging up to 1.7%. While this is far less than the increased efficiency in the case of the suction valve, which as shown were as high as 4.7%, they still represent a positive result when the discharge valve of this invention is substituted for prior flat discharge valves.

Figure 12:
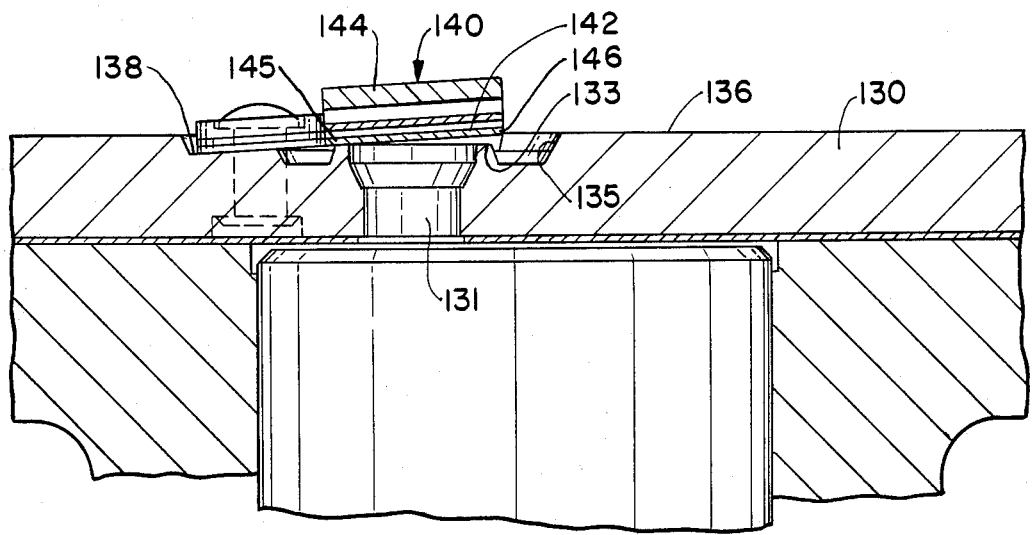
FIG. 12. is a fragmentary, cross-sectional view similar to FIG. 10 showing another embodiment of the discharge valve in the unstressed condition.

Although in the embodiments described above for both the suction and discharge valves, the valve itself was distorted by a plastic deformation along a skew line, it is recognized that the same result can be obtained in another fashion. In the embodiment shown in FIG. 12, the valve plate 130, which is substantially the same as the valve plate 82, is formed with a discharge passage 131 which opens into a valve seat 133, which is formed by a surrounding annular groove 135. However, in this case, the annular valve seat 133 is recessed below the upper surface 136 of the valve plate, and the upper surface of the valve plate has an inclined surface 138 formed therein. The inclined surface 138 underlies the entire valve assembly 140 and is inclined at an angle such as two degrees transversely of the valve seat 133. The valve assembly 140, including valve reed 142 and valve stop 144, may be substantially the same as the discharge valve assembly 95 shown in the embodiment of FIGS. 6–11 except that the valve reed 142 is flat and undistorted by any plastic deformation. In this case, the valve reed 142 will, in the unstressed condition, lie in the plane of the inclined surface 138. However, since the inclined surface 138 has substantially the same orientation as the valve reed head 107 as described in the previous embodiment, the flat valve reed 142 will now, when in the unstressed condition, have the one side 145 in contact with the valve seat 133 while the opposite side 146 will be raised out of contact with the valve seat a distance determined by the angle of inclination of the inclined surface 138. In this case, it is necessary to elastically deform the valve reed 142 to come into sealing engagement with the valve seat 133, while on the initial opening movement, the spring action caused by such deformation will cause the side 146 to move away from the valve seat 133 on the initial opening action, and the valve will function in substantially the same manner as the previously described discharge valve.

Although the preferred embodiment of this invention has been shown and described, it should be understood that various modifications and rearrangements of the parts may be resorted to without departing from the scope of the invention as disclosed and claimed herein.

What is claimed is:

1. A reed valve for a refrigeration compressor having a cylinder having an open end, a valve plate extending over said open end, a piston reciprocable in said cylinder, a valve port opening in said valve plate, said valve plate having a valve seat around said valve port, a valve reed having a base fixedly secured with respect to said valve plate and having a head portion spaced from said base, an axis extending from said base to said head portion, said head portion including a sealing portion operable to make sealing engagement with said valve seat when biased by fluid pressure, said sealing portion when said valve reed is unstressed being resiliently biased out of sealing engagement with said valve seat, with said sealing portion lying in a plane inclined to the plane of said valve seat and in contact with the valve seat at a point thereon on one side of said axis.

2. A reed valve as set forth in claim 1, wherein said resilient bias results from a plastic deformation of said valve reed along a bend line located between said base and said sealing portion.

3. A reed valve as set forth in claim 2, wherein said bend line makes an acute angle with respect to said axis of said valve reed.

4. A reed valve as set forth in claim 1, wherein said valve reed has a reduced neck portion between said base and said sealing portion.

5. A reed valve as set forth in claim 4, wherein said resilient bias results from a plastic deformation of said valve reed along a bend line located at said neck portion.

6. A reed valve as set forth in claim 5, wherein said bend line makes an acute angle with respect to said axis.

7. A suction valve for a refrigeration compressor having a cylinder having an open end, a valve plate extending over said open end, a piston reciprocable in said cylinder, a valve port opening in said valve plate, said valve plate having a valve seat around said valve port facing said piston, a valve sheet extending over said valve plate on the side adjacent said piston in surface abutting contact with said valve plate, said valve sheet having a slot cut therein to define a valve reed, said valve reed having a base portion at the end of said slot and spaced from said valve seat and having a head portion spaced from said base, a longitudinal axis extending from said base to said head portion, said head portion including a sealing portion operable to make sealing engagement with said valve seat when biased by fluid pressure in said cylinder, said sealing portion when said valve reed is unstressed being resiliently biased out of sealing engagement with said valve seat with said sealing portion lying in a plane inclined to the plane of said valve seat and in contact with said valve seat at one point thereon on one side of said longitudinal axis.

8. A suction valve as set forth in claim 7, wherein said resilient bias results from a plastic deformation of said valve reed along a bend line located between said base portion and said sealing portion.

9. A suction valve as set forth in claim 8, wherein said bend line makes an acute angle with respect to said longitudinal axis.

10. A suction valve as set forth in claim 7, wherein said valve reed has a reduced neck portion between said base portion and said sealing portion.

11. A suction valve as set forth in claim 10, wherein said resilient bias results from a plastic deformation of said valve reed along a bend line at said neck portion.

12. A suction valve as set forth in claim 11, wherein said bend line makes an acute angle with respect to said longitudinal axis.

13. A discharge valve for a refrigeration compressor having a cylinder having an open end, a valve plate extending over said open end, a piston reciprocable in said cylinder, a discharge plenum on the side of said valve plate away from said piston, a valve port opening in said valve plate, said valve plate having a valve seat around said valve port in said discharge plenum, a valve reed in said discharge plenum having a base fixedly secured with respect to said valve plate and having a head portion spaced from said base, an axis extending from said base to said head portion, said head portion including a sealing portion operable to make sealing engagement with said valve seat when biased by fluid pressure in said discharge plenum, said sealing portion when said valve reed is unstressed being resiliently biased out of sealing engagement with said valve seat, with said sealing portion lying in a plane inclined to the plane of said valve seat and in contact with the valve seat at a point thereon on one side of said axis.

14. A discharge valve as set forth in claim 13, wherein said resilient bias results from a plastic deformation of said valve reed along a bend line located between said base and said sealing portion.

15. A discharge valve as set forth in claim 14, wherein said bend line makes an acute angle with respect to said axis of said valve reed.

16. A discharge valve as set forth in claim 15, wherein said valve reed has a reduced neck portion between said base and said sealing portion.

17. A discharge valve as set forth in claim 16, wherein said bend line makes an acute angle with respect to said axis.

18. A discharge valve as set forth in claim 17, including a valve stop means engageable by said valve reed to limit movement of said sealing portion away from said valve seat.

19. A discharge valve as set forth in claim 18, including a back-up spring between said valve reed and said stop member.

* * * * *